United States Patent [19]

Saito et al.

[11] Patent Number: 5,102,835

[45] Date of Patent: * Apr. 7, 1992

[54] METAL BORIDE CERAMIC MATERIAL

[75] Inventors: Hajime Saito, Aichi; Hideo Nagashima, Ebina; Junichi Matsushita, Nagoya, all of Japan

[73] Assignees: STK Ceramics Laboratory Corporation, Japan; Toshiba Ceramics Co., Ltd., Japan

[*] Notice: The portion of the term of this patent subsequent to Oct. 10, 2006 has been disclaimed.

[21] Appl. No.: 622,638

[22] Filed: Dec. 5, 1990

Related U.S. Application Data

[60] Continuation of Ser. No. 530,332, May 30, 1990, abandoned, which is a division of Ser. No. 285,572, Dec. 16, 1988, abandoned, which is a continuation-in-part of Ser. No. 155,604, Feb. 12, 1988, Pat. No. 4,873,053.

[51] Int. Cl.$^5$ .................... C04B 35/56; C04B 35/58

[52] U.S. Cl. ...................................... 501/92; 501/87; 501/96

[58] Field of Search ............................. 501/87, 96, 92

[56] References Cited

U.S. PATENT DOCUMENTS 4,379,852  4/1983  Watanabe et al. .................... 501/92

Primary Examiner—Theodore Morris
Assistant Examiner—David M. Brunsman
Attorney, Agent, or Firm—Lorusso & Loud

[57] ABSTRACT

A sintered metal boride ceramic body manufactured by mixing 75–99 wt. % of $TiB_2$ powder with 1–25 wt. % in total of Ni powder and C powder to thereby make a mixture, shaping the mixture together with a binder to thereby make a shaped ceramic body, and firing the shaped ceramic body in a non-oxidizing atmosphere.

6 Claims, No Drawings

METAL BORIDE CERAMIC MATERIAL

This is a continuation of application Ser. No. 07/530,332 filed May 30, 1990, now abandoned which is a divisional application of copending U.S. application Ser. No. 07/285,572 filed Dec. 16, 1988 and entitled "A Metal Boride Ceramic Material", now abandoned which is a continuation-in-part of U.S. application Ser. No. 07/155,604 filed Feb. 12, 1988, issued October 10, 1989 as U.S. Pat. No.4,873,053 and entitled "A Method for Manufacturing A Metal Boride Ceramic Material".

BACKGROUND OF THE INVENTION

Conventional metal boride ceramic materials are manufactured by a hot pressing method, for example, as disclosed in Japanese Patent Laid-Open Nos. 52-106306 and 54-90314.

The conventional metal boride ceramic materials have poor density and low strength even if they are manufactured by hot pressing and sintered.

SUMMARY OF THE INVENTION

The object of this invention is to provide a metal boride ceramic material of high density, high strength and high hardness.

The present invention provides a sintered metal boride ceramic body manufactured by mixing 75-99 wt. % of $TiB_2$ powder with 1-25 wt. % in total of Ni powder and C powder to thereby make a mixture, shaping the mixture together with a binder to thereby make a shaped ceramic body, and firing the shaped ceramic body in a non-oxdizing atmosphere.

DESCRIPTION OF THE EMBODIMENTS

A metal boride matrix functions as a grain boundary layer for $TiB_2$ particles.

For example, such a metal boride matrix is formed by the following equation:

$$TiB_2 + 2Ni + C \rightarrow 2NiB_2 + TiC;$$

$$TiB_2 + Ni + C \rightarrow NiB + TiC; \text{ or}$$

$$TiB_2 + 6Ni + C \rightarrow 2Ni_3B + TiC.$$

In the metal boride matrix, the metal boride and TiC are in a mixed crystal and/or solid solution so that pores can be removed. Thus, the $TiB_2$ particles are sufficiently bound (densified) by the metal boride that the relative density of the sintered ceramic material can be 95% or more. The relative density is equal to (bulk density/theoretical density).

According to a preferred embodiment of this invention, the $TiB_2$ particles each has an average particle diameter of 0.5 to 8 microns (for the best results 0.5 to 3 microns), a maximum diameter of 12 microns (for the best results 6 microns) and a purity of 99 wt. % or more. Ni powder has an average diameter of 1 to 5 microns (for the best results 1 to 3 microns) and a maximum diameter of 12 microns (for the best results 6 microns). Carbon powder such as carbon black powder has a specific surface of 50 to 150 m$^2$/g (for the best results 80 to 150 m$^2$/g), a purity of 99.9 wt. % or more, an average diameter of 10 to 100 nanometers (for the best results 10 to 50 nanometers) and a maximum diameter of 150 nanometers (for the best results 100 nanometers).

The sintered titanium boride ceramic body can be produced as follows:

As a first step, 75-99 wt. % $TiB_2$ particles are mixed with 1-25 wt. % in total of Ni powder and C powder to thereby make a mixture.

Preferably, the $TiB_2$ particles have an average particle diameter of 0.5 to 8 microns (for the best results 0.5 to 3 microns), a maximum diameter of 12 microns (for the best results 6 microns) and a purity of 99 wt. % or more. Ni powder has an average diameter of 1 to 5 microns (for the best results 1 to 3 microns) and a maximum diameter of 12 microns (for the best results 6 microns). C powder such as carbon black powder has a specific surface area of 50 to 150 m$^2$/g (for the best results 80 to 150 m$^2$/g), a purity of 99.9 wt. % or more, an average diameter of 10 to 100 nanometers (for the best results 10 to 50 nanometers) and a maximum diameter of 150 nanometers (for the best results 100 nanometers).

The preferred weight ratio of Ni powder/C powder is from 7:0.1 to 7:10.

As a second step, the mixture is further mixed so as to be homogeneous.

In a third step, the mixture is set in a mold together with a binder such as polyvinylalcohol. After that, a pressure of 100-800 Kg/cm$^2$ is uniaxially applied to the mixture to thereby make a green compact.

In a fourth step, a pressure of 800-3,500 Kg/cm$^2$ is further applied to the green compact, for example, by a cold isostatic press method so that the ceramic body is shaped, for example, into the form of a nozzle or sleeve.

As a fifth step, the shaped ceramic body is sintered at 1,500° C.-2,000° C. (preferably 1,600° C.-1,800° C.) by a pressureless method or under a pressure of 100-500 Kg/cm$^2$ in non-oxidizing atmosphere such as Ar or H$_2$ gas to thereby make a sintered ceramic body.

EXAMPLE 97.5 wt. % $TiB_2$ particles having an average diameter of 3 microns, a maximum diameter of 6 microns and a purity of 99 wt. % are mixed with 2.5 wt. % in total of Ni powder having an average diameter of 1 micron and carbon black powder having a specific surface area of 135 m$^2$/g and a purity of 99 wt. % to thereby make a mixture. The weight ratio of Ni/C is 7:1. 100 parts of the mixture are placed in a plastic container together with urethane balls and 300 parts ethylenealcohol and then mixed in a wet condition for 24 hours. The mixture is maintained at 60° C. for 10 hours so as to be dried.

After that, 100 parts of the mixture is set in a mold together with 2 parts of polyvinylalcohol as a binder. A pressure of 300 Kg/cm$^2$ is uniaxially applied to the mixture to thereby make a green compact. In addition, a pressure of 3,000 Kg/cm$^2$ is applied to the green compact by a cold isostatic press method to thereby shape the ceramic body into the form of a desired rolling sleeve.

The shaped ceramic body is heated to 1,700° C. at a temperature rising rate of 15° C./minute in an Ar atmosphere by a pressureless method and then maintained at 1,700° C. for one hour to thereby make a sintered ceramic body.

According to this invention, it is easy to manufacture a metal boride ceramic material having high density, high strength and high hardness.

We claim:
1. A method for producing a sintered metal boride ceramic body, said method comprising:

mixing 75-99 wt. % of $TiB_2$ powder with 1-25 wt. % in total of Ni powder and C powder to thereby make a mixture;

shaping said mixture together with a binder to thereby make a shaped ceramic body; and firing the shaped ceramic body in a non-oxidizing atmosphere to react the Ni powder and the C powder with a portion of the $TiB_2$ powder to form nickel boride and titanium carbide matrix containing dispersed $TiB_2$ particles, in accordance with at least one of the following equations:

$$TiB_2 + 2Ni + C \rightarrow 2NiB + TiC;$$

$$TiB_2 + Ni + C \rightarrow NiB_2 + TiC; \text{ and}$$

$$TiB_2 + 6Ni + C \rightarrow 2Ni_3B + TiC.$$

2. The method of claim 1, wherein the weight ratio of Ni/C is from 7:0.1 to 7:10.

3. The method of claim 1, wherein the average diameter of the $TiB_2$ powder is 0.5 to 8 microns; the maximum diameter of the $TiB_2$ powder is 12 microns; the average diameter of the Ni powder is 1 to 5 microns; the maximum diameter of the Ni powder is 12 microns; the average diameter of the C powder is 10 to 100 nanometers; and the maximum diameter of the C powder is 150 nanometers.

4. The method of claim 1, wherein the specific surface area of the C powder ranges between 50 and 150 $m^2/g$.

5. The method of claim 1, wherein said firing is at a temperature of 1500° C.-2000° C.

6. The method of claim 4, wherein said firing is at a temperature of 1600° C.-1800° C.

* * * * *

UNITED STATES PATENT AND TRADEMARK OFFICE
CERTIFICATE OF CORRECTION

PATENT NO. : 5,102,835
DATED : April 7, 1992
INVENTOR(S) : SAITO et al

It is certified that error appears in the above-identified patent and that said Letters Patent is hereby corrected as shown below:

Col. 1, line 15, after the heading "BACKGROUND OF THE INVENTION", insert as a new paragraph, --This invention relates to a metal boride ceramic material.--.

IN THE CLAIMS:

Col. 3, line 8, after "powder" insert a comma --,--.

Col. 4, line 16, delete "4" and insert --1--.

Signed and Sealed this

Thirteenth Day of July, 1993

Attest:

MICHAEL K. KIRK

Attesting Officer

Acting Commissioner of Patents and Trademarks